United States Patent [19]
Lambert et al.

[11] Patent Number: 5,639,066
[45] Date of Patent: Jun. 17, 1997

[54] BIDIRECTIONAL FLOW CONTROL VALVE

[75] Inventors: Daniel J. Lambert, Hubertus; Derek A. Dahlgren, Brown Deer; Thomas J. Stobbs, Brookfield, all of Wis.

[73] Assignee: Applied Power Inc., Butler, Wis.

[21] Appl. No.: 582,854

[22] Filed: Jan. 4, 1996

Related U.S. Application Data

[63] Continuation-in-part of Ser. No. 491,018, Jun. 15, 1995.
[51] Int. Cl.$^6$ ............................................. F16K 31/06
[52] U.S. Cl. ................................. 251/282; 251/129.07
[58] Field of Search .................... 251/129.07, 129.08, 251/129.15, 282; 137/625.38, 625.65, 625.68

[56] References Cited

U.S. PATENT DOCUMENTS

| | | | |
|---|---|---|---|
| 2,987,293 | 6/1961 | Knudson | 251/129.07 |
| 3,889,709 | 6/1975 | Dwyer . | |
| 4,643,227 | 2/1987 | Suzuki et al. | 251/129.07 X |
| 4,750,704 | 6/1988 | Brundage | 251/129.08 X |
| 5,011,113 | 4/1991 | Stobbs et al. . | |
| 5,299,600 | 4/1994 | Aronovich | 251/129.08 X |
| 5,377,720 | 1/1995 | Stobbs et al. . | |

*Primary Examiner*—Kevin Lee
*Attorney, Agent, or Firm*—Quarles & Brady

[57] ABSTRACT

A bidirectional flow control valve has one port co-axial with a tubular spool and another port opening to the side of the spool, with openings formed in the sidewall of the spool to establish communication between the two ports. The end of the spool adjacent to the one port abuts the brim of a tubular hat-shaped insert which extends inside the lumen of the spool to a closed end on the distal side of the other port. Openings are formed in the sidewall of the insert which are in communication with openings in the sidewall of the spool via an annular groove in the exterior of the insert. The insert reacts against flow forces, helps equalize pressures from one end of the spool to the other, and does not increase the pressure drop across the valve.

4 Claims, 1 Drawing Sheet

BIDIRECTIONAL FLOW CONTROL VALVE

This is a continuation in part of U.S. patent application Ser. No. 08/491,018 filed Jun. 15, 1995.

BACKGROUND OF THE INVENTION

1. Field of the Invention

This invention relates to flow control valves, and in particular to a bidirectional hydraulic flow control valve.

2. Discussion of the Prior Art

Hydraulic valves capable of regulating high pressure and/or high flow rates in either direction through them are known. Typically, to achieve the desired degree of control with relatively high pressures or flow rates, bidirectional flow control valves have been two stage. Thus, the main stage of the valve was controlled by a hydraulic pressure which was capable of exerting a high force on the main stage spool so as to positively locate it in the desired position, and resist the flow forces through the valve. However, this required the pilot stage of the valve, which was typically controlled by an electro-magnetic coil, to generate the relatively high hydraulic forces needed for positively controlling the main stage spool.

These two stage bidirectional flow control valves were relatively heavy, bulky and expensive. In certain applications, such as in the application of a bypass valve in an automotive power steering system, the size and weight of bidirectional flow control valves made them undesirable. Thus, a need exists for a smaller, lighter and less expensive flow control valve.

SUMMARY OF THE INVENTION

The invention provides a bidirectional flow control valve operable to regulate flow in either direction between two ports having a valve with one of the ports formed in the housing at a proximal end of and coaxial with the main bore and with a second one of the ports formed in the housing and opening into a side of the bore. A tubular spool is slidably received in the bore, and the spool has a lumen which is co-axial with the first port and a radial opening in the wall of the spool, with an edge of the opening being positioned to wipe across an edge of the second port so as to vary the cross-sectional area of a flow passage between the first and second ports in an area defined between the edges of the opening and of the second port. A tubular insert is secured to the housing with its brim between the proximal end of the spool and the first port, the insert being coaxial with the bore and extending from its open end adjacent to the first port to a closed end which is on the distal side of the second port. The insert reacts against flow forces and protects the spool from the forces, so that the valve can be a single stage valve.

In a preferred aspect, the insert is smaller in diameter than the lumen of the spool so as to allow leakage between the outer diameter of the insert and the lumen of the spool to flow into the lumen to both ends of the spool. An orifice may also be provided in the end of the insert. The spool is thereby pressure balanced in the main bore.

These and other objects and advantages of the invention will be apparent from the drawings and the detailed description.

BRIEF DESCRIPTION OF THE DRAWING

The drawing is a cross-sectional view of a bidirectional flow control valve of the invention.

DETAILED DESCRIPTION OF THE PREFERRED EMBODIMENTS

Figure 1:
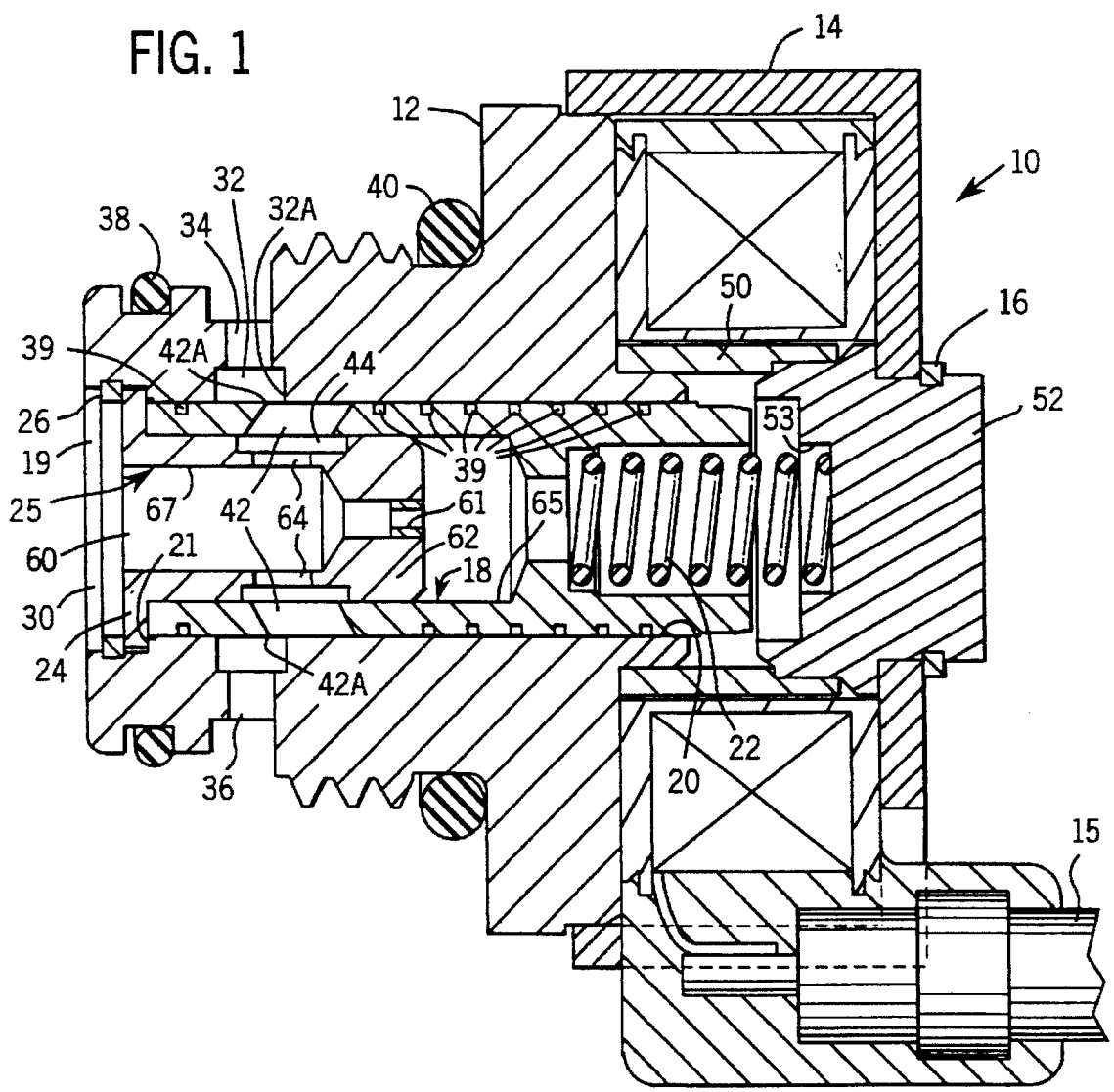

The drawing illustrates a valve 10 of the invention. The valve 10 includes a body 12, a coil 14 secured to the body 12 by snap ring 16 and energized by wires 15, and a hollow tubular spool 18 slidably received in main bore 20 which is formed in the body 12. In its normal position, shown in FIG. 1, spool 18 is biased by spring 22 against brim 24 of hat-shaped insert 25, which is secured in a counterbore 19 of the bore 20 by a retaining ring 26.

A first port 30 is formed in the body 12 coaxial with the main bore 20 and an annular second port 32 is formed as a groove in the main bore 20. Radial holes 34 and 36 establish communication between port 32 and the exterior of the body 12 between O-rings 38 and 40, with O-ring 38 sealing port 30 from holes 34 and 36 and O-ring 40 sealing the bore (not shown) into which valve 10 is screwed.

Spool 12 has pressure equalization grooves 39 formed around its outer diameter which equalize the pressure acting around the spool 18. In addition, spool 18 has one or more bores 42 which open into an annular groove 44 formed in the outside of the sidewall of the insert 25, to provide communication between the port 32 and the groove 44. The axes of the bores 42 are acutely angled to the axis of the main bore 20 so as to help reduce Bernoulli forces acting on the spool. Edge 32A of port 32 and the edges 42A of the ports 42 define between them a flow area which is variable according to the axial position of the spool 18.

At the rear or distal end of the body 12, a stainless steel sleeve 50 is brazed to the body 12 and a steel pole piece 52 is brazed to the distal end of the sleeve 50. The distal end of spring 22 is seated in bore 53 formed in pole piece 52. A spring force adjusting mechanism could also be provided in the pole piece 52, for example as disclosed in commonly owned pending patent application Ser. No. 08/491,018 filed Jun. 15, 1995, the disclosure of which is hereby incorporated by reference.

Insert 25 extends from its open end 60, which is on the proximal side of the openings 42 and around which the brim 24 radially extends, inside of the lumen 65 the spool 18. The insert 25 extends axially into the lumen 65 to a substantially closed end 62 which is on the distal side of the openings 42. Radial bores 64 extend through the sidewall of the insert 25 to provide communication between the lumen 67 the insert 25 and the annular groove 44.

In operation, the insert 25 prevents the flow from impinging axially on the spool 18 directly. The insert 25 reacts against axial flow forces and transmits them through the brim 24 to be reacted against by the housing 12, since the brim 24 is constrained axially relative to the housing between the ring 26 and the shoulder 21. Thus, the forces resulting from the axial decelerations which occur in the flow when the flow is in the direction from port 30 to port 32 and the forces which result from the axial accelerations which occur when the flow is in the opposite direction are born by the insert 25, and ultimately by the housing 12.

A clearance is provided between the outer diameter of the insert 25 and the diameter of the lumen 65 the spool 18 and an orifice 61 is provided in the closed end 62. The orifice 61 is sufficiently small (e.g.,0.040 inches in the preferred embodiment) so that end 62 is substantially closed, to isolate the spool 18 from the flow forces. This clearance and the orifice 61 permit a sufficient leakage of fluid to the distal side of the closed end 62 so as to hydraulically balance the spool 18 from one end to the other. Therefore, essentially the only net axial forces (other than friction) acting on the spool are the forces of the spring 22 and of the coil 14. Thus, the coil 14 and spring 22 need not react against the fluid forces, either static or dynamic, which could otherwise be significant.

Many modifications and variations to the preferred embodiments described will be apparent to those skilled in the art. For example, the insert could be applied to a different construction of a tubular spool valve, or the groove 44 could be provided in the inside diameter of the spool 18, rather than on the outside diameter of the insert 25. Therefore, the invention should not be limited to the embodiments described, but should be defined by the claims which follow:

We claim:

1. A bidirectional flow control valve having at least two ports and being operable to regulate flow in either direction between said two ports, comprising;

a valve housing having a main bore with a first one of said ports formed in said housing at a proximal end of said bore and co-axial with said bore and with a second one of said ports formed in said housing and opening into a side of said bore;

a tubular spool slidably received in said bore, said spool having a lumen which is co-axial with said first port and an opening in a wall of said spool, an edge of said opening being positioned to wipe across an edge of said second port so as to vary the cross-sectional area of a flow passage between said first and second ports in an area defined between said edges of said opening and said second port;

an insert extending from said first port into said lumen of said spool, said insert having a lumen which is co-axial with said first port with a first end on a proximal side of said opening in said spool which is open and adjacent to said first port and a second end inside said lumen of said spool opposite from said first end and on a distal side of said opening in said spool, said second end being substantially closed, a brim radially extending around said first end which is captured by said housing between said spool and said first port, and an opening formed in said insert between said first and second ends, said opening being in communication with said opening in said spool; and means for axially shifting said spool.

2. A bidirectional flow control valve as claimed in claim 1, wherein an annular groove on an exterior diameter of said insert provides communication between said opening in said insert and said opening in said spool.

3. A bidirectional flow control valve as claimed in claim 1, wherein said insert is smaller in diameter than said lumen of said spool so as to allow leakage between an outer diameter of said insert and said lumen of said spool to flow into said lumen to both ends of said spool.

4. A bidirectional flow control valve as claimed in claim 1, wherein an orifice is formed in said second end of said insert to allow leakage between an outer diameter of said insert and said lumen of said spool to flow to a distal side of said second end.

* * * * *